(12) United States Patent
Groat et al.

(10) Patent No.: US 9,461,875 B2
(45) Date of Patent: Oct. 4, 2016

(54) METHOD AND SYSTEM FOR DYNAMICALLY OBSCURING ADDRESSES IN IPV6

(75) Inventors: Stephen L. Groat, Alexandria, VA (US); Matthew W. Dunlop, Ellicott City, MD (US); William M. Urbanski, Roanoke, VA (US); Randolph C. Marchany, Blacksburg, VA (US); Joseph Tront, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 750 days.

(21) Appl. No.: 13/878,278

(22) PCT Filed: Oct. 7, 2011

(86) PCT No.: PCT/US2011/055234
§ 371 (c)(1),
(2), (4) Date: Apr. 30, 2013

(87) PCT Pub. No.: WO2012/048206
PCT Pub. Date: Apr. 12, 2012

(65) Prior Publication Data
US 2013/0212249 A1   Aug. 15, 2013

Related U.S. Application Data

(60) Provisional application No. 61/391,109, filed on Oct. 8, 2010.

(51) Int. Cl.
*H04L 12/24* (2006.01)
*H04L 9/16* (2006.01)
*H04L 29/06* (2006.01)
*H04L 29/12* (2006.01)

(52) U.S. Cl.
CPC ............... *H04L 41/00* (2013.01); *H04L 9/16* (2013.01); *H04L 61/2092* (2013.01);
(Continued)

(58) Field of Classification Search
CPC ..... H04L 63/0823; H04L 9/30; H04L 51/28; H04L 63/1408; H04L 9/3273; H04L 63/0442; H04L 63/0435; H04L 63/1441; H04L 9/0825; H04L 9/083; H04L 2209/42; H04L 45/74
USPC ........................................................ 709/223
See application file for complete search history.

(56) References Cited

U.S. PATENT DOCUMENTS 6,502,135 B1   12/2002  Munger et al.
7,739,497 B1    6/2010  Fink et al.
(Continued)

*Primary Examiner* — Ruolei Zong
(74) *Attorney, Agent, or Firm* — Whitham, Curtis & Cook, P.C.

(57) ABSTRACT

The invention dynamically obscures network and transport layer addresses of packets to achieve anonymity, including authentication privacy, as well as protection against tracking and traffic correlation and certain classes of network attacks by combining both intrusion protection with anonymity, avoiding the use of a separate management unit outside the host for distribution of obscured addresses. The invention enables a host to automatically configure obscured addresses and determine the obscured address of the intended recipient without outside involvement, computing addresses based on a set of parameters, and to operate without re-authentication whenever an address changes. The invention enables encryption of the packet payload to prevent traffic correlation. The technology of the invention can be implemented embedded on a host device or as a connected gateway device and requires negligible configuration and is therefore transparent to hosts.

22 Claims, 11 Drawing Sheets

(52) U.S. Cl.
CPC ...... *H04L 61/2525* (2013.01); *H04L 63/0407* (2013.01); *H04L 61/2539* (2013.01); *H04L 63/0435* (2013.01); *H04L 2209/42* (2013.01)

(56) References Cited

U.S. PATENT DOCUMENTS

| | | | |
|---|---|---|---|
| 8,397,082 B2* | 3/2013 | Milliken | G06F 21/52 713/176 |
| 2004/0034695 A1* | 2/2004 | Touch | H04L 29/12283 709/209 |
| 2004/0088544 A1* | 5/2004 | Tariq | H04L 63/0435 713/162 |
| 2004/0210630 A1* | 10/2004 | Simonnet | H04L 29/12254 709/203 |
| 2010/0042513 A1 | 2/2010 | Sheymov | |
| 2010/0135301 A1* | 6/2010 | Bosch | H04L 45/52 370/392 |
| 2011/0261753 A1* | 10/2011 | Haddad | H04L 9/3236 370/328 |

* cited by examiner

610

620

METHOD AND SYSTEM FOR DYNAMICALLY OBSCURING ADDRESSES IN IPV6

BACKGROUND OF THE INVENTION

1. Field of the Invention

The present invention generally relates to network and transport layer addressing of packets over the Internet and more particularly to techniques for obscuring packet addresses to achieve anonymity and to protect against network attacks.

2. Background Description

The Internet Protocol version 6 (IPv6) was developed as a solution to the rapidly depleting Internet Protocol version 4 (IPv4) address space. Addresses were expected to deplete so quickly that the White House issued a mandate directing all government agencies to transition their backbones to IPv6 by Jun. 30, 2008. Technologies such as Network Address Translation (NAT) allow multiple users to share a single public IPv4 address and have staved off the need for immediate transition. Yet, many of the IPv4 address space expansion mechanisms such as NAT are incompatible with emerging technologies. Two full years after the initial 2008 deadline, the Internet community once again finds itself facing the threat of an Internet Protocol (IP) address shortage. Despite its impending deployment, a large portion of the community is still unfamiliar with IPv6. A brief overview of some of the main features of IPv6 follows, together with some background on how addresses are determined in IPv6.

Features of IPV6

The address space of IPv6 is much larger than that of IPv4. Where IPv4 allocated 32 bits for the address portion of a packet, IPv6 allocates 128 bits. This equates to approximately $5 \times 10^{28}$ addresses for every one of the 6.8 billion people in the world. The 4.3 billion addresses provided by IPv4 is not even enough for one address per person. In today's Internet age, it is not uncommon for a person to have multiple devices connected to the Internet.

Larger address space was not the only improvement made in IPv6. The header format was simplified. Unused fields were removed and the header length in IPv6 was fixed to 40 bytes. Another improvement was moving the options out of the header. Options are now located in the payload section of the IPv6 packet. It also provides space for the defining of new options. The addition of flow labels was also incorporated into IPv6. Flow labels allow traffic to be classified and potentially handled differently at the network layer. Finally, IPv6 integrates authentication and encryption into the protocol. When IPv4 was designed and defined, security was not addressed. As Internet commerce and secure communications became critical to maintain users' security and privacy on the Internet, Internet Protocol Security (IPsec) was developed. Since IPsec was developed after IPv4 was implemented, it became a layer 3.5 protocol, requiring additional overhead and processing. Integrating IPsec functions within IPv6 means that the entire operation can be performed at layer 3. This adds efficiency by increasing throughput and eliminating the need to store the packet during processing.

IPv6 has increased address space. However, the large address space has the potential to add a significant administrative burden. In an effort to mitigate this burden, IPv6 designers included a method for hosts to configure their own addresses. This technique, referred to as StateLess Address Auto Configuration (SLAAC) is discussed in the following section.

Automatic Addressing in IPV6

A new network address configuration architecture is included in IPv6 to simplify network administration. The two parts that make up this mechanism are a Neighbor Discovery Protocol (NDP) and SLAAC. These two pieces together allow a node to self-determine its IP address. NDP is the IPv6 replacement for the Address Resolution Protocol (ARP). It facilitates nodes within a particular subnet learning of other nodes on the link using the Internet Control Message Protocol version 6 (ICMPv6) messages. For example, a NDP router advertisement provides a host with the network portion of the address to configure the first 64 bits of its IPv6 address. For the last 64 bits, the node automatically configures an address, designated as the interface identifier (HD) of the address. The final step combines the 64-bit network address 110 with the 64-bit host address 120, the Interface Identifier (IID) field, to form a complete 128-bit IPv6 address as shown in FIG. 1.

The Neighbor Discovery Protocol and SLAAC eliminate the need for the Dynamic Host Configuration Protocol (DHCP) addressing services currently implemented on the majority of IPv4 networks. DHCP implements a client-server architecture in which a DHCP server assigns addresses to clients and keeps track of which addresses have been assigned to particular clients. DHCP has also been implemented in IPv6 in the fowl of Dynamic Host Configuration Protocol for IPv6 (DHCPv6). The sparse address space and the ease of address auto-configuration make DHCPv6 addressing an unnecessary service. The extra expense and network complexity involved in DHCP addressing have been removed with NDP and stateless IPv6 addressing.

Deterministic IID

As mentioned above, the IID is automatically configured by the host. The current default implementation of SLAAC on most operating systems provides an IID that is deterministic across networks. The IID 120 makes up the last 64 bits of the IPv6 address and is automatically configured by the host based upon the Media Access Control (MAC) address of its network interface device. This is accomplished by extending the 48-bit MAC address to 64 bits through the 64-bit Extended Unique Identifier (EUI-64) format. The EUI-64 format splits the 48-bit MAC address 210 into two 24-bit halves, 220 and 230. The 16-bit hex value 0xFFFE 240 is inserted between the two halves to form a 64-bit address 260. Also, the universal/local flag 250, located at bit seven of the 64-bit host portion, is set to 1 to indicate universal scope. This process is illustrated in FIG. 2.

Like any new protocol, flaws are inherent in the design of IPv6. In particular, hosts configuring their own addresses can lead to a compromise of an IPv6 user's privacy and security. There is a need to overcome this design flaw in IPv6.

SUMMARY OF THE INVENTION

It is therefore an object of the present invention to provide a method for protecting host configured Internet addresses, as used in IPv6, from compromising user privacy and security.

The invention, hereafter called Moving Target IPv6 Defense and abbreviated as "MT6D", dynamically obscures network and transport layer addresses of packets to achieve anonymity, including authentication privacy, as well as protection against tracking and traffic correlation. This is an improvement of prior static approaches where, once they have been assigned, addresses remain constant until a network session is terminated. Additionally, this technique of the invention protects against certain classes of network attacks including but not limited to address-based denial of service, replay, session hijacking, and man-in-the-middle attacks. The invention enables a host to automatically configure its obscured addresses. The invention also enables a host to determine the obscured addresses of those hosts it communicates with without outside involvement. The limitations of prior art efforts to dynamically obscure addresses are overcome by combining both intrusion protection with anonymity, avoiding the use of a separate management unit outside the host for distribution of obscured addresses, as well as enabling operation without renegotiation or re-authentication whenever an address changes.

The technology of the invention also enables hosts to compute addresses based on a set of parameters. This provides more entropy in address selection as well as more seamless communications compared to alternative approaches, such as those that rely on a management unit to issue addresses from an enclave from a pool. Further, the invention also enables encryption of the packet payload to prevent traffic correlation. The technology of the invention can be implemented embedded on a host device or as a connected gateway device and requires negligible configuration and is therefore transparent to hosts. The invention has numerous applications ranging from hosts desiring to keep their locations private to hosts conducting sensitive communications.

An aspect of the invention is a method and system for obscuring network and transport layer addresses in communication between two hosts under IPv6. The invention rotates packet addresses based upon a frequently changing nonce known only to the two communicating hosts. The address rotation interval is preferably no smaller than twice the single-trip time of a packet sent between the two hosts, and yet is small enough to prevent traffic correlation. Addresses can be rotated mid-session without disrupting the ongoing session. Further, the invention dynamically obscures port numbers of the sending and receiving hosts, and dynamically masks the subnets of the communicating hosts. In a further aspect of the invention each packet is encrypted using a symmetric key known only by the two communicating hosts.

It is also an aspect of the invention to obscure the packet address when the nonce changes, using a set of parameters. For example, the packet address can be computed as a functional combination of three values: a value specific to the host; a secret value known only to the two communicating hosts; and the value of the changing nonce when the packet is sent. The secret value can be a symmetric key, and the changing nonce can be derived from a timestamp. Also, the symmetric key can be regenerated dynamically to ensure that the keys are not static. The functional combination can be obtained by concatenating the three values and hashing the concatenation. Another aspect of the invention is that each host is able to predict packet addresses being used by the other communicating host without handshaking. A further aspect of the invention is to vary address rotation times for different host pairs for increased security and scalability. Yet another aspect of the invention is the ability to maintain anonymity of authenticated traffic by tunneling authenticated packets within MT6D.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Related Work

Figure 1:
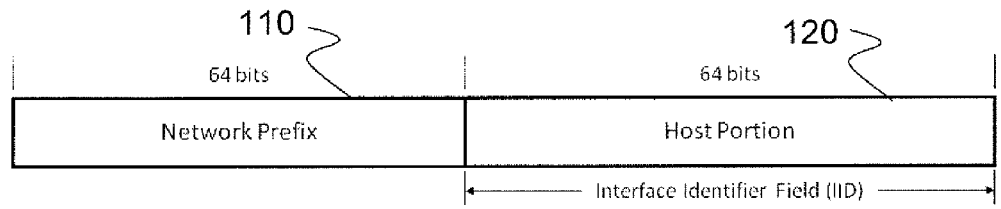
FIG. 1 is a diagram of the 128 bit address format of IPv6.
Figure 2:
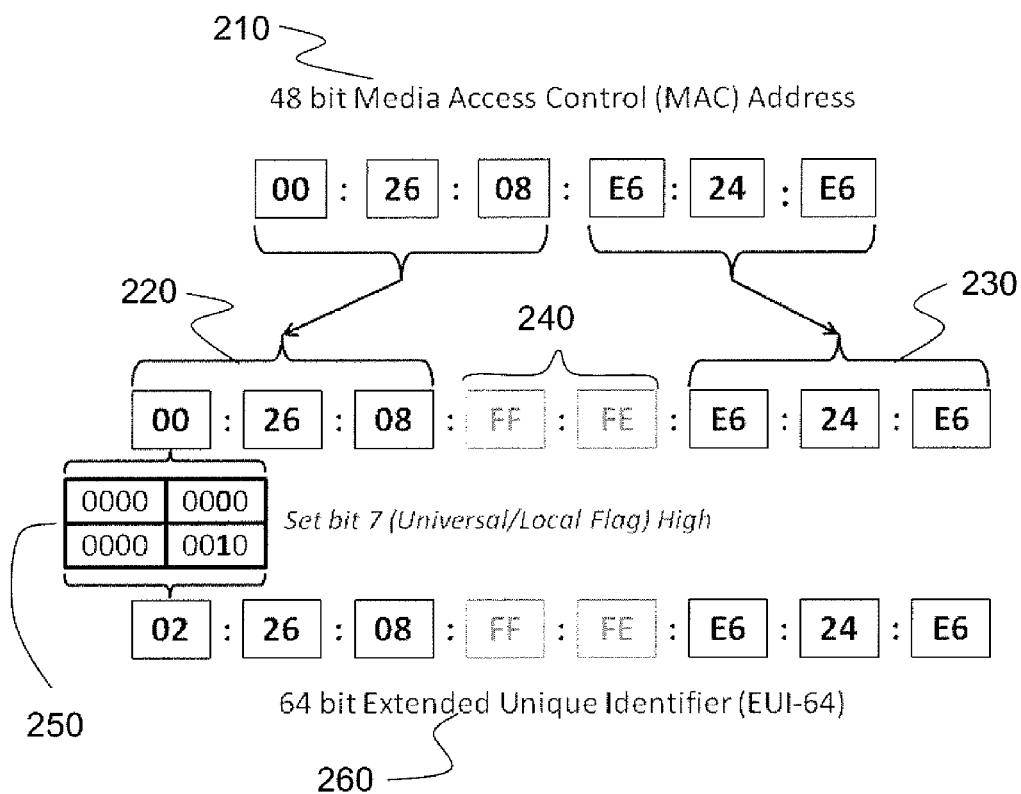
FIG. 2 is a diagram showing how a 64-bit Extended Unique Identifier is constructed from a MAC address.

Moving Target IPv6 Defense ("MT6D") involves dynamic address obscuration. There have been other proposals that also attempt to obscure network addresses. There are those that obscure network addresses for the purpose of privacy and those that obscure addresses to prevent certain classes of network attacks. We present the most relevant proposals and discuss how MT6D differs.

A technique disclosed in U.S. Patent Publication No. 2010/0042513 to Sheymov is also designed with the goal of dynamic obscuration. Instead of focusing strictly on addresses, Sheymov defines cyber coordinates. Cyber coordinates can represent any piece of information in cyber space, to include network addresses. Sheymov's objective behind dynamic obscuration is to provide intrusion protection from certain classes of network attacks. MT6D also prevents these same types of network attacks. The additional benefit MT6D provides is anonymity. Anonymity is not a goal of Sheymov and his design does not provide it. Sheymov uses the Domain Name System (DNS) to assign permanent names to devices. These names are attached to dynamic cyber coordinates, or addresses. An attacker may have difficulty pinpointing the dynamic address to attack the host, but will have little problem correlating traffic from and to the host using a particular DNS name.

Another advantage MT6D has over Sheymov's method is in how dynamic addresses are determined. In Sheymov's method, dynamic addresses are created and distributed from a management unit. The management unit presents an additional attack vector. In MT6D, addresses are calculated on demand by the MT6D hosts. There is no need for a management unit. Any host in a communicating pair, can calculate both the obscured source and destination addresses for every packet sent.

Kewley et al. ("Dynamic approaches to thwart adversary intelligence gathering", at *Darpa Information Survivability Conference and Exposition,* 2001) also proposed a technique for dynamically obscuring host addresses called Dynamic Network Address Translation (DYNAT). Like MT6D, DYNAT obscures both network and transport layer addresses. MT6D improves upon DYNAT in a couple of ways. First, MT6D rotates addresses regardless of the state of ongoing sessions. With DYNAT, address obscuration is only possible between sessions. The second advantage is that MT6D hosts purge stale addresses. DYNAT allows previously used addresses to resolve. Previously used addresses can be used by adversaries to attack target systems.

U.S. Pat. No. 7,043,633 to Fink et al. ("Fink") discloses a technique for dynamically obscuring host addresses called Adaptive Self-Synchronized Dynamic Address Translation (ASD). ASD is similar to MT6D in that its objective is to hide the location of communicating hosts. It does this by rotating the symmetric keys used to encrypt source and destination addresses. Symmetric keys are established through a handshake process between a trusted sender and receiver enclave. When a symmetric key expires, the enclaves again enter into a key exchange handshake operation. An enclave, in its preferred embodiment, encompasses a subnet. Obscured addresses are selected from those available to the ASD enclave. The idea of having an enclave of available addresses was also used with DYNAT.

MT6D improves upon ASD by basing address rotation on a frequently changing nonce (in MT6D's preferred embodiment, derived from a timestamp) instead of a rotating session key. This allows MT6D hosts to communicate without the need to reauthenticate each time an address rotates. Additionally, MT6D hosts are better suited to change addresses more often. In MT6D, hosts are able to predict each other's addresses resulting in a more seamless, efficient, and transparent session. Another key issue with hosts having to reauthenticate is that these communications minimally give away the identity of the trusted enclaves communicating. In MT6D, once the system has been bootstrapped, there is no need for an authentication handshake to occur each time the address is rotated, which provides further protection for communicating hosts. Additionally, MT6D leverages the Duplicate Address Detection (DAD) capability provided by NDP in IPv6. This results in the capability for MT6D to be implemented on a single host instead of as part of an enclave.

A weakness of both Sheymov's method and ASD is that they do not prevent traffic correlation. Both of these techniques concentrate on obscuring fields in the packet header, but not the payload. Packet payloads can be pieced together to discern information about the communicating hosts. In the preferred embodiment of MT6D, the packet payload is encrypted along with the header information to prevent both tracking and correlation. DYNAT claims to prevent traffic correlation, but attackers can use fields from the Transmission Control Protocol (TCP) header, such as sequence number, for traffic correlation. A weakness of all three schemes related to MT6D is that they have no method of masking the subnet of the communicating hosts. A third party sniffing a sparsely populated network can, with reasonable accuracy, pinpoint the hosts implementing the obscuration technique. This is particularly easy for the third party if a particular sender is the only host on a subnet communicating with a receiver on another subnet. MT6D provides a solution for this with Dynamic Subnet Obscuration (DSO).

U.S. Pat. No. 6,502,135 to Munger et al. ("Munger") discloses a method for establishing secure communication link between computers of virtual private network called Tunneled Agile Routing Protocol (TARP). TARP obscures addresses by tunneling encrypted packets through a series of TARP routers. Although addresses do not change mid-session, each packet may be tunneled through a different series of TARP routers. Each packet is encrypted beneath multiple encryption layers and undergoes a minimum number of hops to prevent traffic correlation. Any TARP router is capable of determining the final packet destination.

MT6D differs from TARP in a number of ways. First, address obscuration in MT6D occurs mid-session without the use of encryption. This reduces the overhead and latency required to operate MT6D. Even when MT6D uses encryption to protect the packet header and payload, only one layer of encryption is required. Another advantage of MT6D is that there is no requirement for a global trust model. Keys exist only between communicating end hosts. With TARP, all TARP routers must trust each other. A compromised TARP router is able to track the destination address of all packets passing through it.

TARP routers are able to change their network addresses, but must do so by notifying all other TARP routers. This notification puts the identity of TARP routers at risk, particularly if there are compromised TARP routers in the network. To allow this communication, all TARP routers also maintain an unchangeable address, which further puts the TARP network at risk. MT6D does not require the use of any static addresses. Additionally, hosts are able to predict each other's addresses without the need for any exchange of packets.

MT6D also differs in that it can be implemented on a per host basis. This minimizes the risk of packets being compromised before encapsulation. TARP is installed on routers, which assumes no comprised hosts within the trusted network. A compromised host inside the TARP trusted network would be able to observe communications prior to any encryption being applied. Another difference is that TARP routers can be targeted for attack. By launching a denial of service against a TARP router, an attacker can effectively deny service to all hosts on the subnet. MT6D devices use only the obscured address, which frequently rotates. If an attacker locates and attacks a MT6D address, the attack can last for at most the length of time between address changes.

Two other proposals obscure addresses to achieve anonymity. The two proposals are privacy extensions and Cryptographically Generated Addresses (CGAs). Privacy extensions (as described in Draft Standard RFC 4941, September 2007) were designed with the intent of protecting IPv6 addresses that use SLAAC. CGAs (as described in Proposed Standard RFC 4581, October 2006) were designed to securely associate IPv6 addresses with public keys for use with the Secure Neighbor Discovery protocol. This association also hides the address of the packet source. Neither of these schemes dynamically obscure addresses. Once an address is assigned, it remains constant, minimally, until the network session is terminated. A third party monitoring the connection can accomplish both address tracking and traffic correlation. These techniques also only obscure the source address. MT6D not only rotates addresses multiple times within a single session, but also does so for both the source and destination addresses.

System Overview

MT6D provides a means for hosts to communicate with each other over the public Internet while maintaining anonymity from targeting, tracking, and traffic correlation. The system does this through tunneling IPv6 packets inside "MT6D" packets. Both sender and receiver network and transport layer addresses are dynamically obscured in the new header created by MT6D. MT6D can also implement packet encryption over the entire tunneled packet to prevent an attacker from analyzing the payloads or header fields of any collected packets.

Figure 3A:
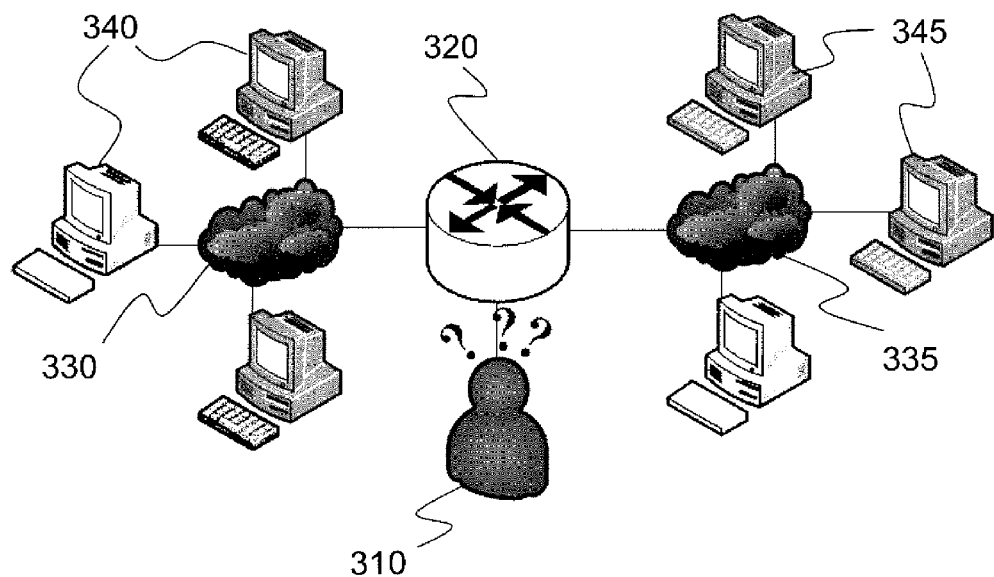
FIG. 3A is a schematic showing how a network attacker would view two communicating hosts using the invention.
Figure 3B:
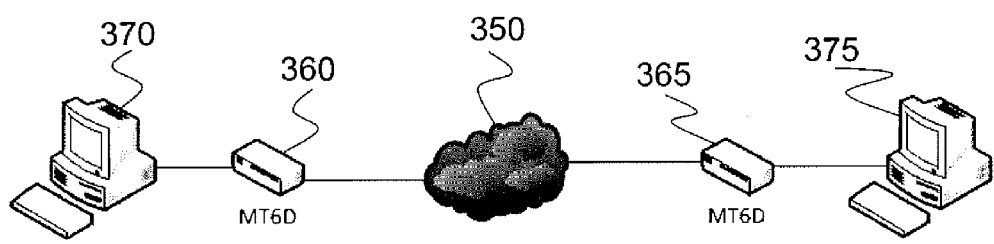
FIG. 3B is a schematic showing the actual network configuration for the invention.

MT6D rotates addresses based off a set of parameters known only to the two communicating hosts. The pair of communicating hosts is able to compute the synchronized pairs of addresses without any external transmission. Therefore, there is no requirement for any sort of trust model that extends beyond the communicating pair of nodes. MT6D also has no need for communicating hosts to exchange parameters prior to each communication session, meaning that dynamic addresses cannot be linked to host identities. A unique feature of MT6D is that the dynamically obscured addresses can change even in the middle of ongoing sessions without breaking the connection or requiring a new handshake. This feature allows addresses to change as often as the security posture dictates rather than being constrained by ongoing network sessions. FIG. 3A provides a simplified example of what two hosts using MT6D over a network might look like to an attacker verses what is actually occurring as shown in FIG. 3B.

Attacker 310 witnesses network communications between two subnets 330 and 335. To the attacker 310, network packets seems to traverse between multiple, unrelated hosts 340 and 345 over the Internet 320. The attacker 310 is unable to distinguish the actual number of communicating hosts nor the identities of the actual source and destination hosts. This is because packets in a packet steam between host 370 and host 375 have their addresses obscured by MT6D devices 360 and 365. What appears to the attacker 310 as multiple, unrelated hosts 340 and 345 is really only two hosts 370 and 375.

Motivation

We discussed in the background section how SLAAC has created serious privacy issues for IPv6 users. This is especially true since EUI-64 addresses provide third parties with the ability to globally track users on the Internet. Address tracking is not the only concern. Hosts are also susceptible to traffic correlation, meaning that a third party can piece together packets from multiple sessions to map human users to network traffic. These types of vulnerabilities, as well as certain types of network attacks, are mitigated by MT6D.

MT6D preserves a host's privacy in a number of ways. First, MT6D dynamically obscures the sender and receiver addresses. This prevents a third party from pinpointing the identity of either communicating host. Since the third party cannot identify the host, tracking is prevented. By tracking, we mean, that a third party is capable of pinpointing the geographic location of a node based on the network it associates with. The dynamic obscuration of addresses also prevents network traffic correlation. A third party may be able to capture a few packets communicated between two unknown hosts, but not enough to determine the nature of the network traffic. Since both communicating host addresses can change multiple times within the course of a single session, a third party will be unable to link previously captured packets with newly observed packets. Second, to further hide the nature of network traffic, each packet is, by default, encrypted using a symmetric key shared only by the two communicating hosts. The incorporation of encryption prevents any third party from using payload analysis in an attempt to correlate network traffic.

Certain network attacks are prevented by MT6D due to the nature of dynamically rotating network addresses. These attacks include, but are not limited to, address-based denial of service, replay, session hijacking, and man-in-the-middle attacks. MT6D prevents these attacks by rotating the addresses an attacker would use to target the victim. Each of these attacks is accomplished by targeting a specific network address. When the host address changes, the targeted victim disappears. The only way for the attacker to accomplish these address-based attacks is by compromising the symmetric key shared by the communicating hosts. Even a key compromise has a limited window of effectiveness in MT6D due to periodically changing symmetric keys. Application-layer attacks, however, are not prevented since MT6D operates at the network layer.

Design

The Moving Target IPv6 Defense provides a means for hosts to communicate with each other over the public Internet while maintaining complete anonymity from tracking or traffic correlation. The system is comprised of three main components. The first component dynamically obscures the sender and receiver IIDs. The second component dynamically obscures the sender and receiver port numbers. The third component dynamically obscures the sender and receiver subnets.

The Moving Target IPv6 Defense dynamically obscures network and transport layer addresses of packets to achieve anonymity and protect against certain classes of network attacks. The Sheymov reference, described above, also dynamically obscures addresses. Sheymov focuses mainly on intrusion protection while MT6D focuses on anonymity as well as intrusion protection. Sheymov's technique also relies on a management unit to distribute obscured addresses. MT6D hosts automatically configure obscured addresses with no outside involvement.

The Fink reference, also described above, dynamically obscures addresses using Adaptive Self-Synchronized Dynamic Address Translation (ASD). This technique requires hosts to negotiate a new symmetric key each time an address changes. This technique was built off the DYNAT technique, described above. MT6D obscures based on a nonce and can rotate addresses without re-authentication. ASD also relies on an enclave to issue addresses from a preset pool. MT6D hosts do not rely on a specific pool of addresses. Instead, they can use the entire subnet space to generate addresses. Addresses are generated based on a set of parameters such as MAC address, a symmetric key, and a nonce derived from a timestamp. This provides more entropy in address selection as well as more seamless communications. None of these previous techniques encrypts the packet payload. MT6D does so to prevent traffic correlation, which provides significantly improved anonymity. In its preferred implementation, MT6D protects against address tracking, traffic correlation, and certain classes of network attacks. MT6D can be implemented embedded on a host device or as a gateway device. Use of MT6D requires negligible configuration and is transparent to applications and hosts. It has numerous applications ranging from hosts desiring to keep their locations private to hosts conducting sensitive communications.

Dynamic Addressing

Dynamic addressing modifies the network-layer and transport-layer addresses of the sender and receiver nondeterministically. MT6D is capable of dynamically changing these addresses to hide identifiable information about a host, obscuring communicating hosts from any third-party host. A key feature of MT6D is that this obscuration can be made mid-session between two hosts without causing connection reestablishment or breakdown.

Dynamic IID Obscuration

MT6D dynamically changes the IIDs of the sender and receiver based on a changing value known to both hosts. In its preferred embodiment, the changing values are time increments. The changing value is designed to vary over a small enough time increment to prevent traffic correlation. At each address change, the actual host IID is hashed with a set of parameters to dynamically obscure the identity of the host.

IID Computation

MT6D IIDs are computed using three components obscured by a function. The first component is a value specific to an individual host (e.g. a MAC address). The second component is a secret (e.g. symmetric key) shared by the sender and receiver. The third component is a changing value known by both parties (e.g. time). The only one of these three values that must be kept secret is the shared secret. The term "shared secret" means a previously agreed upon information item (e.g. a symmetric key) shared only between specific communicating hosts that is used in the IID computation. The function results in a 64-bit output used as the MT6D IID and has the form:

$$IID'_{x(i)} = f\{IV_x * S * CV_i\}_{64} \quad (1)$$

where $IID'_{x(i)}$ represents the obscured IID for host x at a particular instance i, $IV_x$ represents a value specific to the individual host x, S represents the shared secret, and $CV_i$ represents the changing value at instance i. The three components are combined using an operation denoted by, *. The 64-bit function result is denoted by $f\{.\}_{64}$.

One possible implementation is computed using a host's EUI-64 IID, a shared symmetric key, and a timestamp. These three values are concatenated and hashed. The leftmost 64 bits of the hash (bits 0-63) are used as the obscured IID and has the form:

$$IID'_{x(i)} = H[IID_x \| K_S \| t_i]_{0 \to 63} \quad (2)$$

where $IID'_{x(i)}$ represents the obscured IID for host x at time $t_i$, $IID_{x(i)}$ represents the EUI-64 IID of host x, $K_S$ represents the shared symmetric key, and $t_i$ represents the time at instance i. The leftmost 64 bits of the hash value are denoted by $H[.]_{0 \to 63}$.

Time Incrementation

Time T will increment at $t_i$ intervals. The length of the interval (e.g. $t_{i+1} - t_i$) depends on the level of obscurity desired. Although it would be simple to set the rotation interval as small as possible, the frequency at which $t_i$ increments should be no smaller than twice the single-trip time (2·STT) of a packet sent between a sender and receiver. It is necessary to have $t_i > (2 \cdot STT)$ in order for the sender of the packet to be able to predict with reasonable accuracy the value of $t_i$ when the receiver receives the packet. By making the minimum rotation twice the STT, a packet created at the end of the first STT can be sent using $t_i$. A packet sent within one STT of the next address rotation will be sent using the $t_{i+1}$ address. This is to ensure that when the packet arrives at the destination, the proper address is in use.

Time intervals vary for each communicating address pair. Only the two hosts involved in a communication session can predict their address rotation interval. The address rotation interval is determined without the need for a handshake to occur between the two communicating hosts.

Varying address rotation intervals is done both from a network management perspective and from a security and privacy perspective. From a network management perspective, varying address rotation times lessens the burden on networking equipment. A large number of MT6D users on a subnet, all changing addresses at the same time, has the potential to place a burden on a router by forcing it to simultaneously bind every new address. Varying the rotation times of hosts using MT6D distributes the binding of new addresses. From a security and privacy perspective, rotating addresses unpredictably increases the difficulty a third party has of identifying which hosts are using MT6D. If all hosts using MT6D change addresses at the same time, it is feasible for an attacker to determine the number of hosts using MT6D by observing address changes at rotation times.

IPv6 Address Concatenation

The IPv6 address is formed by concatenating the host's subnet with $IID'_{x(i)}$ as follows:

$$IP'_{x(i)} = Subnet_x \| IID'_{x(i)}$$

IID Rotation

Hosts using MT6D will rotate to the next dynamic address at every increment of $t_i$. At each time increment, MT6D recalculates both the sender and receiver network-layer and transport-layer addresses of each communicating pair using Equation 1. MT6D also purges the addresses for $t_{i-1}$ to prevent any connection attempts from malicious third parties. Purging past IIDs will also prevent replay attacks.

IID Notification and Lifetime

Each time a host recalculates its obscured IID, it must notify the local gateway device of its new IPv6 address so that packets can be properly forwarded. This notification occurs through the use of NDP. The NDP serves two purposes. First, Neighbor Solicitation and Advertisement Messages verify the new address does not conflict with a preexisting address on the subnet by performing DAD. The second purpose is to ensure that the gateway device has the new MT6D IPv6 address for proper delivery of incoming packets.

At any given time, gateway devices will maintain multiple IPv6 addresses that correlate with a single obscured host. This is beneficial to minimize packet loss. Future obscured IPv6 addresses are precalculated and advertised so that gateway devices add the new host address to their neighbor cache prior to packets arriving containing that address. To accommodate this requirement, host x will notify the gateway device of $IP'_{x(i+1)}$ at time $t_i$. Addresses for previous time increments are purged from MT6D tables to prevent replay attempts. Purging must be done at the host since previously discarded addresses will remain in the gateway device's neighbor cache until no response is received after MAX_UNICAST_SOLICIT solicitations.

The host will store two obscured IPv6 address states. The two states are $IP'_{i(xi)}$ and $IP'_{x(i+1)}$. The state $IP'_{x(i)}$ corresponds to the current computed obscured IPv6 address. This is considered the active state. The state $IP'_{x(i+1)}$ corresponds to the obscured IPv6 address that will be utilized at the next time increment. The state at $t_{i+1}$ is stored but not used until $t_i$ increments to the next time interval. It is precalculated to verify the validity of $IP'_{x(i+1)}$ within the subnet prior to time $t_i$. As already discussed, the state $IP'_{x(i-1)}$ is purged from the host. Any packets delayed past the active state will be discarded and handled according to the appropriate transport layer protocol of the original packet. The frequency with which $t_i$ increments can be tuned to minimize packet loss due to delay. It is worth noting that $t_i$ cannot be manipulated by a third party without compromising a MT6D host.

Dynamic Port Obscuration

In addition to dynamically obscuring IIDs, ports must also be obscured. If port numbers are left unobscured, a third party can use the port numbers of collected packets to correlate the packets with one another. MT6D includes two techniques to dynamically obscure the source and destination ports. The first technique allows the host to specify a port address range that MT6D should use. The benefit of specifying a port range is that MT6D can be configured to use common transport layer ports that more closely mimic normal network traffic. The second technique obscures port numbers using a similar technique as that of the IID obscuration in Equation 1. For example, obscured ports could leverage the unused bits of the hash calculation in Equation 2 as follows:

$$\text{Src\_Port}_i = H[IID_{Src_i} \| K_S \| t_i]_{64 \rightarrow 69}$$

$$\text{Dest\_Port}_i = H[IID_{Dest_i} \| K_S \| t_i]_{64 \rightarrow 69}$$

Figure 4:
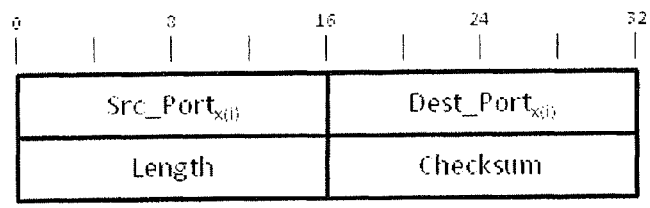
FIG. 4 is a diagram showing an exemplar transport layer protocol header format for use by the invention.

The source port, annotated by Src_Port utilizes the next 16 bits of the source IID hash (bits 64-79) while the destination port, annotated by Dest_Port$_i$, utilizes bits 64-79 of the destination IID hash. The obscured port numbers are used as the port numbers in the MT6D header. Since the current implementation of MT6D encapsulates all packets using the Unreliable Datagram Protocol (UDP), no other transport-layer header fields need to be obscured. FIG. 4 illustrates the MT6D UDP header.

Dynamic Subnet Obscuration

MT6D can support Dynamic Subnet Obscuration (DSO) using encrypted tunnels between federated MT6D nodes. This is achieved by nondeterministically routing packets through trusted MT6D hosts. Each MT6D host that handles the packet will compute a new DSO header for the packet. By routing packets through other MT6D nodes it will be difficult to trace the original packet from the source subnet to the destination subnet. Since intermediate nodes are chosen nondeterministically for each packet, unavailable intermediate nodes do not break MT6D since they are responsible for only a portion of the packets being sent between the sender and receiver. With a connection-oriented protocol, these packets will be retransmitted through different intermediate nodes. DSO will incur additional latency due to extra hops and processing imposed on each packet. Subnet obscuration is useful, however, in sparsely populated networks where sniffed traffic could assist a third party in correlating network traffic. IPv6 destination options are used to notify hosts that DSO is to occur.

MT6D Tunneling

Rather than rewriting each original packet using the obscured IPv6 addresses of the sender and receiver, the original packet is encapsulated in a MT6D tunnel. The benefit of retaining the original packet is that any established end-to-end connections between the source and destination are retained as well as any flags specific to that session. Not only does the implementation of MT6D become transparent to the host, but also the MT6D connection can have different configuration settings.

Figure 5:
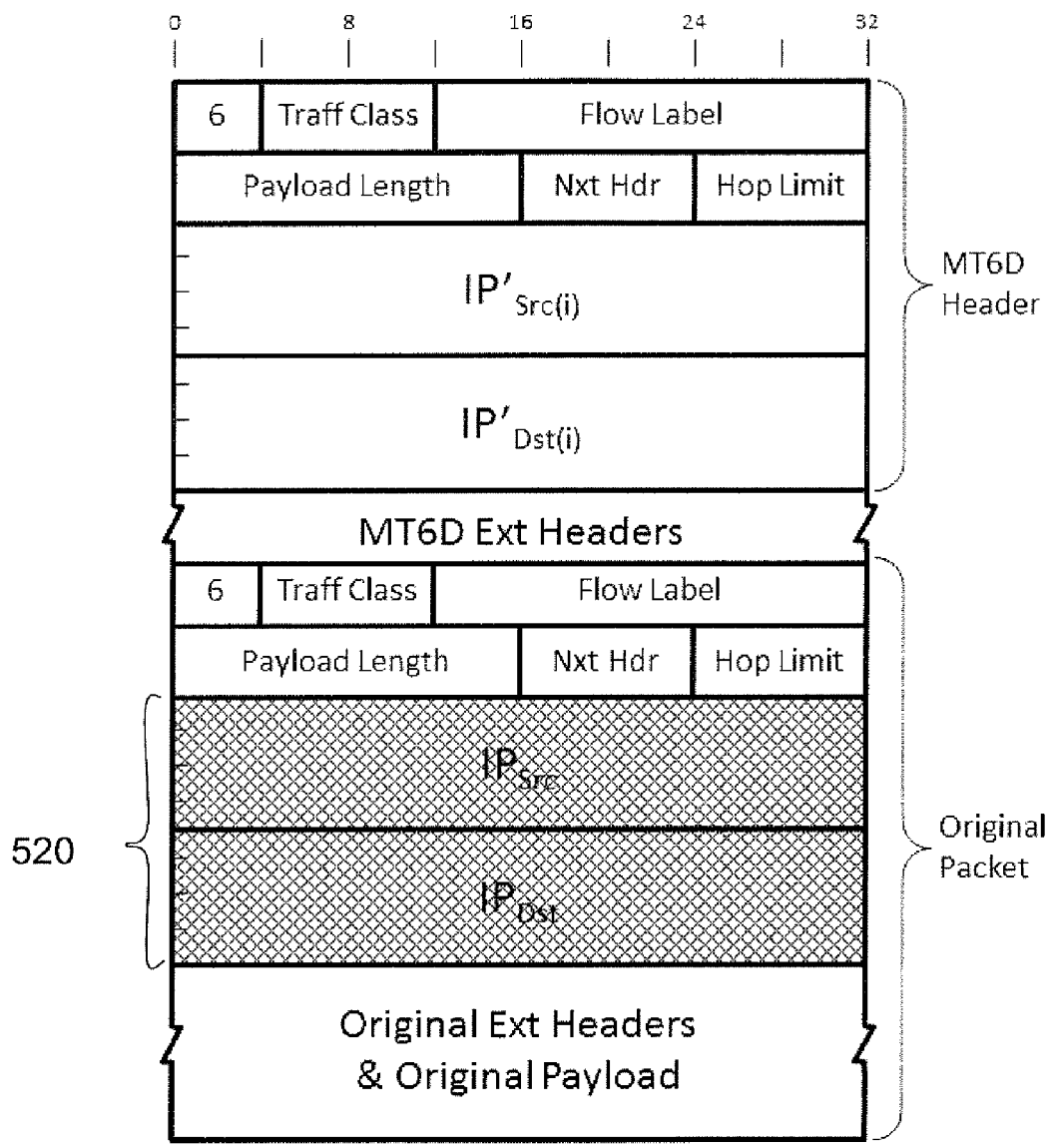
FIG. 5 shows an original IPv6 header tunneled within an MT6D packet, with the original and source destination addresses removed to prevent address tracking and reduce overhead.

A MT6D packet is formed by first removing the source and destination addresses from the original packet. The Ethernet frame is also removed to anonymize the MAC addresses. This does not present an issue since it will be reconstructed at the destination MT6D device. The entire packet is then prepended with a MT6D header as illustrated in FIG. 5. The MT6D header is formed using the dynamically obscured source and destination addresses discussed earlier in this section. The MT6D packet is also configured to use a transport layer protocol that supports connectionless communication.

In one implementation, each packet is encapsulated in UDP to prevent TCP connection establishment and termination from occurring every time a MT6D address rotates. Encapsulating packets as UDP has a minimal effect on the transport layer protocol of the original packet. Since transport layer protocols are end-to-end, decapsulation will occur before the host processes the original packet. A session using TCP will still exchange all required TCP-related information. This information will simply be wrapped in a MT6D UDP packet. Additionally, any lost packets that were originally TCP will be retransmitted by the end host after a retransmission timeout occurs.

Encrypted Tunnel

Figure 6A:
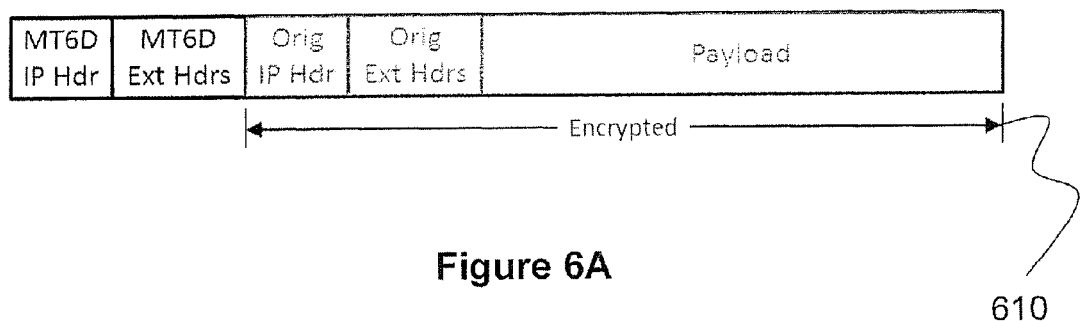
FIGS. 6A and 6B are schematics showing encrypted and unencrypted tunneled packets, respectively.

By default, MT6D encrypts each original packet before appending it with the MT6D header. An example of a MT6D encrypted packet is shown in FIG. 6A. By encrypting the original packet, a third party is unable to glean any useful information from the packet. For example, if the original packet is sent using TCP, the header gets encrypted so that a third party cannot attempt to correlate network traffic using the TCP sequence numbers. Additionally, the nature of the network traffic is also kept private through encryption.

Figure 7A:
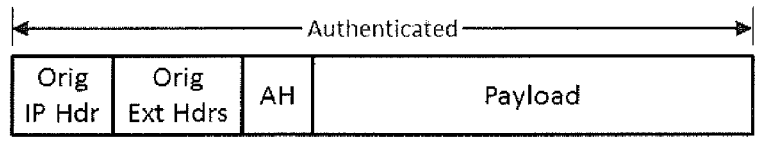
FIGS. 7A and 7B are schematics showing original and encapsulated versions of authenticated IPv6 packets, respectively.
Figure 7B:
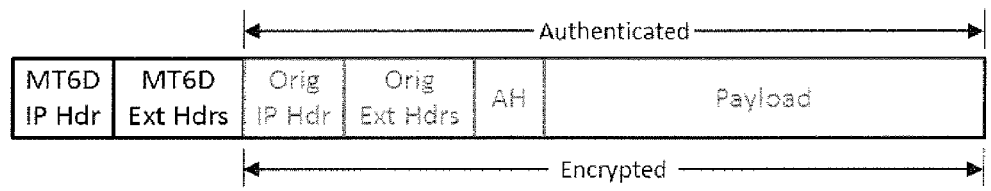

Another benefit of encrypted tunnels is that hosts are able to authenticate traffic to each other while still maintaining their anonymity to any third party. Since the original authenticated packets (see FIG. 7A) get encrypted using a symmetric key, a third party will be unable to detect that the packets are authenticated (see FIG. 7B). Additionally, a third party observer will glean no identifiable information about the communicating hosts from captured packets.

Unencrypted Tunnel

Figure 6B:
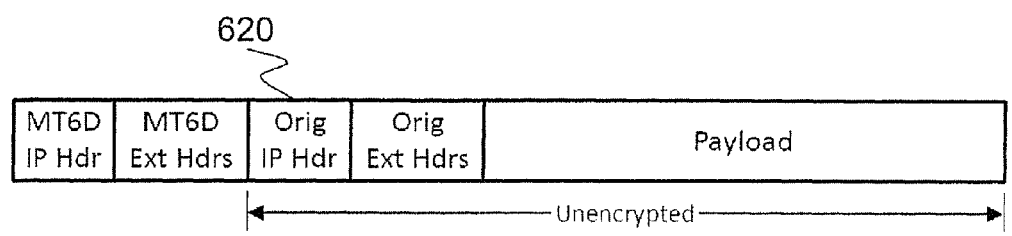

MT6D includes the option to tunnel the original packets unencrypted as illustrated in FIG. 6B. Since the source and destination addresses are stripped from the original packet header 620 (as shown by cross hatching 520 in FIG. 5), address tracking is not feasible. Additionally, a third party is unable to determine which two hosts are communicating. Unencrypted tunnels do not, however, prevent traffic correlation since the remainder of the original headers and payloads stay intact. Traffic correlation does require deep packet inspection because any relevant header fields are embedded within the MT6D packet payload. Unencrypted tunnels may be preferred in environments where minimizing computational expense is more important than preserving privacy. Whether using encrypted or unencrypted tunnels, protection from targeted network attacks is still preserved.

Symmetric Key Usage

Symmetric keys in MT6D are either preloaded, exchanged out-of-band, or exchanged in-band. Of the three techniques, in-band key exchange is the least preferred because it is the most susceptible to eavesdropping. Eavesdropping on an in-band key exchange exposes the real host IPv6 addresses of the communicating hosts. We do not attempt to solve key exchange issues, we only point out the possible options for establishing keys. It is worth noting that even if a malicious host learns a host's real IPv6 address, he or she cannot match observed MT6D packets to that particular host.

Periodically changing symmetric keys should be done to prevent the possibility of key compromise. MT6D includes a means to periodically generate new symmetric keys in-band. This technique is referred to as in-band dynamic key generation (i-DKG). The distinction between i-DKG and out-of-band dynamic key generation (o-DKG) is made since users have the option to generate keys out of band on a predetermined key schedule.

MT6D handles i-DKG through the use of IPv6 destination options. New symmetric keys exchanged in-band of an ongoing MT6D session do not expose hosts' real addresses. i-DKG information required to establish new symmetric keys is embedded within normal network traffic between two communicating hosts and is completely transparent to the communicating hosts.

Figure 11A:
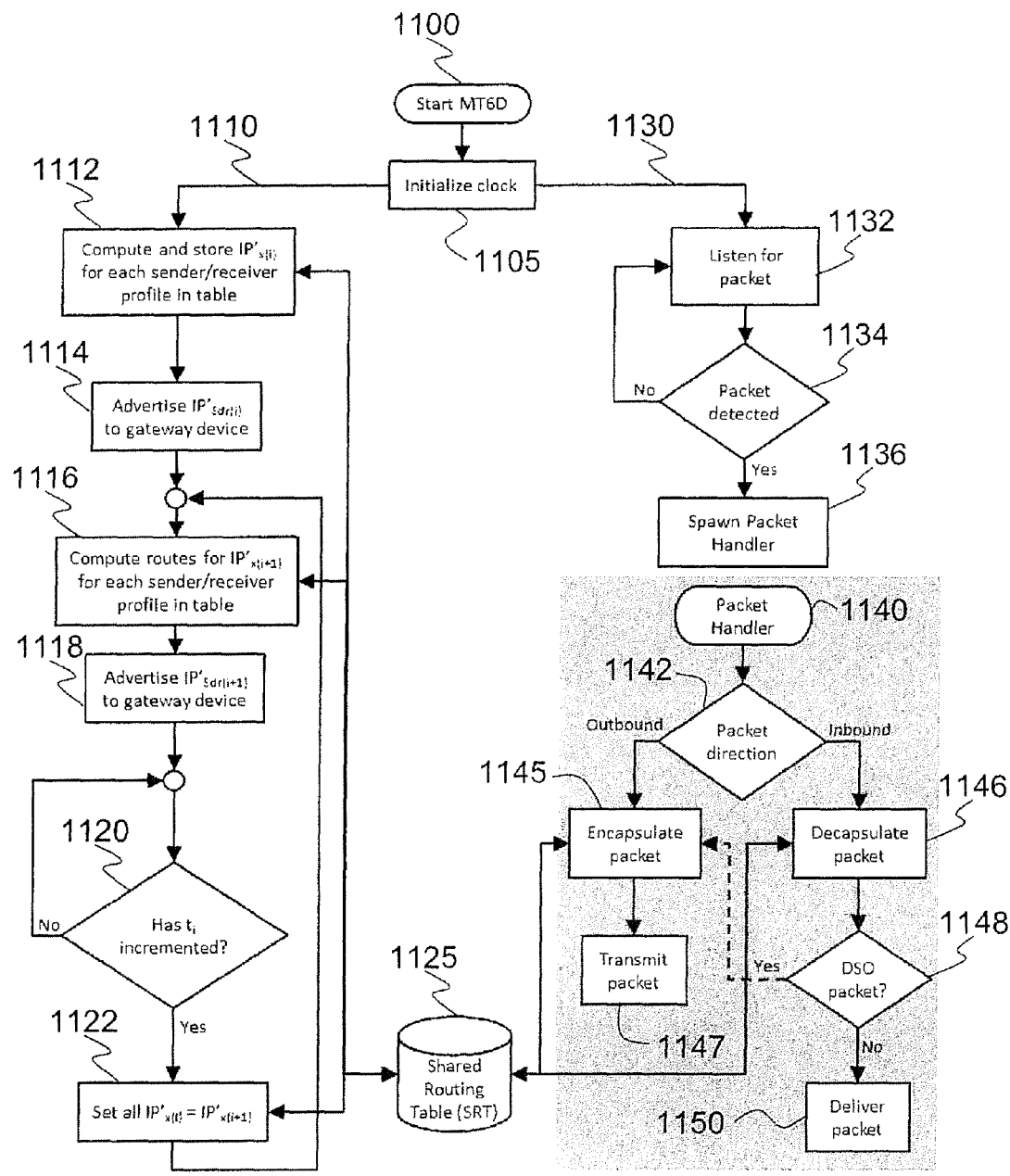
FIG. 11A is a flow diagram for operation of the invention.
Figure 11B:
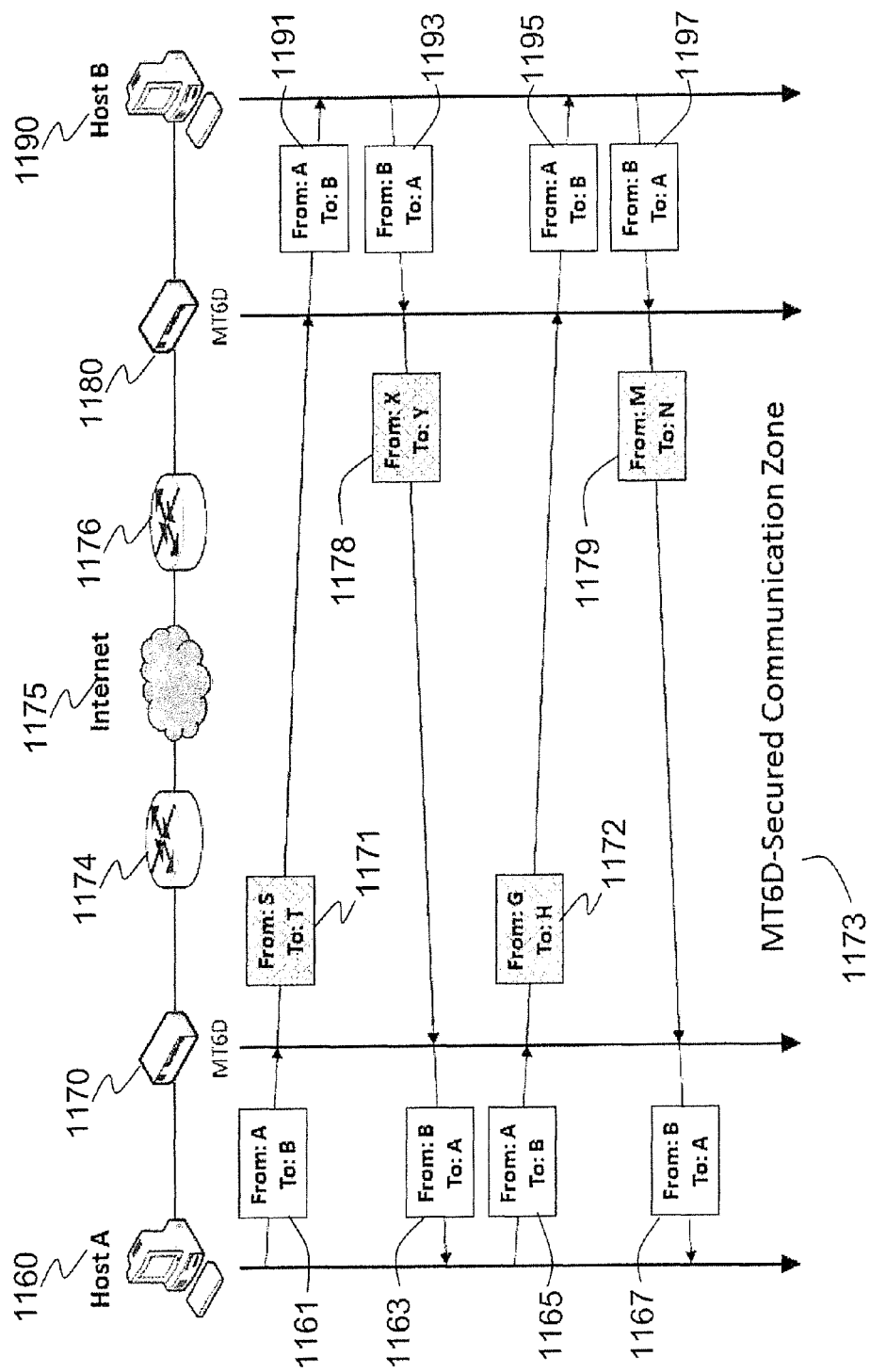
FIG. 11B is a conceptual flow diagram showing operation of the invention.
Figure 11C:
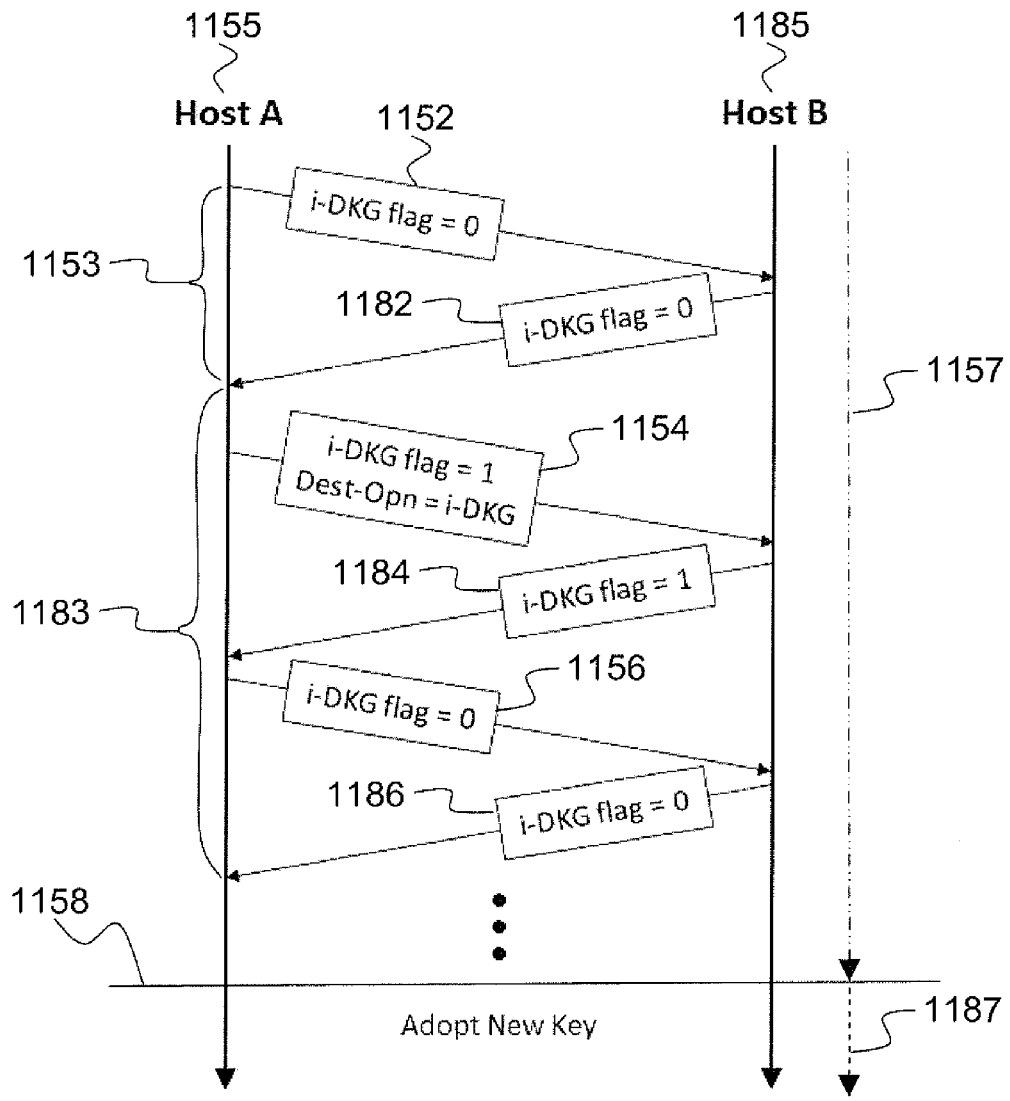
FIG. 11C is a conceptual flow diagram showing change of the symmetric key.

FIG. 11C illustrates the i-DKG exchange process. Prior 1153 to i-DKG initialization 1183, Host A 1155 and Host B 1185 have i-DKG flags set to the initial state (i-DKG=0, as shown in packets 1152 and 1182). At a predetermined time, before the actual key change time 1158, Host A 1155 initiates i-DKG 1154 by setting the i-DKG flag and using the IPv6 destination options to transmit the information required to establish a new symmetric key. Host B 1185 acknowledges 1184 receipt of the new key. Since all i-DKG messages piggyback on normal packets exchanged between Host A and Host B, it adds more assurance if Host A 1155 acknowledges 1156 receipt of Host B's acknowledgement. Host B 1185 then reverts back 1186 to its initial state indicating that at key change time 1158, both hosts have the new key. If either Host A 1155 or Host B 1185 miss an i-DKG message (1154, 1184, 1156, 1186), both hosts revert back to the initial state 1153 and begin again after a back-off period. The old key is in use 1157 up until key change time 1158, and the new key is in use 1187 thereafter.

It should be noted that hosts need to share a key to bootstrap the MT6D system. While the secure sharing of keys is outside the scope of the problem MT6D addresses, there are a few ways hosts can learn about other MT6D hosts. For example, host pairs can pre-share keys before using MT6D, either out-of-band (preferred) or in-band. Either technique will provide security, privacy, and anonymity. In-band, however, exposes the actual host addresses during key establishment. By doing that, the attacker is aware that, at some point, host A will talk to host B. The attacker does not know when this will occur, nor can he/she be sure that observed packets can be tied to either host. For an organization using MT6D, it is feasible for them to run a key distribution system that stores keys. Users can log into the server to get keys.

Architecture

Figure 8:
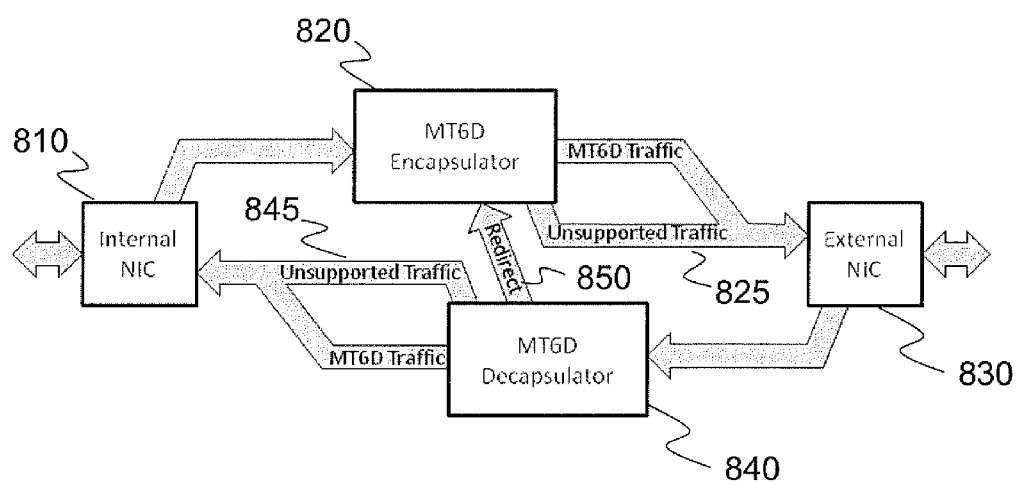
FIG. 8 is a diagram of the MT6D architecture for a single host.

The architecture for a single MT6D host is illustrated in FIG. 8. The architecture at the other end of the MT6D tunnel mirrors FIG. 8. MT6D is designed to be virtually transparent to the user. Each packet is encapsulated by the sender and sent to the internal MT6D Network Interface Controller (NIC) 810. This NIC can be a physical NIC, when MT6D is implemented in a separate device, or a virtual NIC, when implemented in software on the host. The internal NIC directs all incoming packets to the MT6D encapsulator 820.

Figure 9:
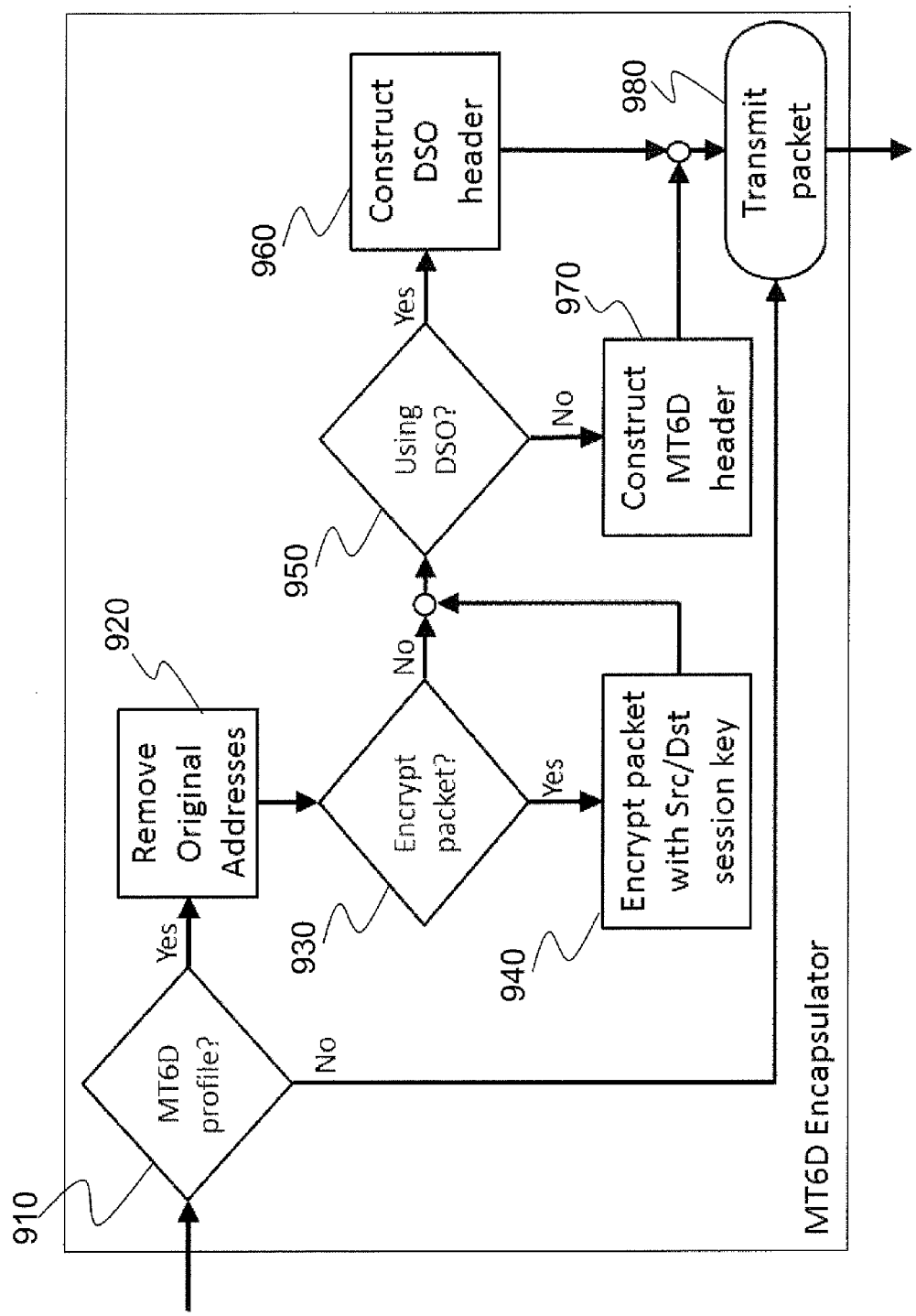
FIG. 9 is a flow diagram for the MT6D encapsulator.

The MT6D encapsulator 820, whose logical flow is shown in FIG. 9, transmits all outbound packets. Upon receipt of a packet, the encapsulator checks 910 to see if a MT6D profile exists for the sender/receiver pair. The encapsulator maintains a table of all valid MT6D destinations that a sender trusts. These entries are referred to as profiles. Each profile includes the shared symmetric key that is valid between the host and each receiver. If no profile exists, the packet is treated as non-MT6D traffic, also referred to as unsupported traffic 825. Unsupported traffic 825 is either blocked (for more secure operations) or immediately forwarded to the nearest gateway device. It may be necessary to allow unsupported traffic to facilitate communication with hosts that do not use MT6D (e.g. some web servers). Packets that match profiles have the source and destination network addresses removed 920 in the packet header. They are then checked 930 to see if encryption is desired. Encryption is optional and is used 940 to protect against traffic correlation or to hide authenticated traffic. Whether the packet is encrypted or not, the next step is to check 950 to see if the packet is using DSO. If it is, then the packet is tunneled 960 using a DSO header. Otherwise, the packet is placed inside a MT6D tunnel 970 as depicted in FIG. 5. The final step is to pass the packet to the external NIC 830 by transmitting it 980. The external NIC 830, like the internal NIC 810, can be either a hardware or a virtual NIC.

Figure 10:
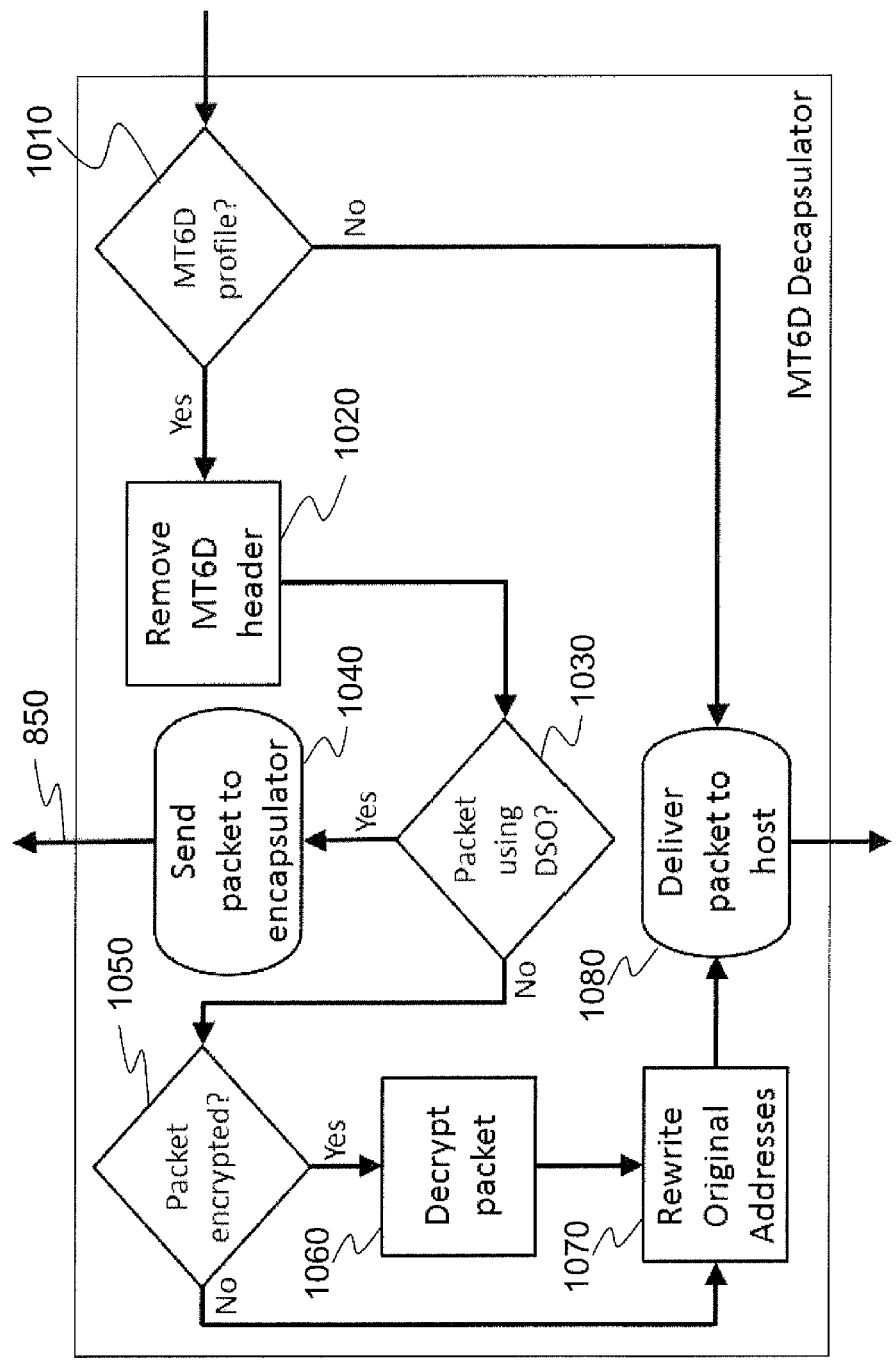
FIG. 10 is a flow diagram for the MT6D decapsulator.

The MT6D decapsulator 840, whose logical flow is shown in FIG. 10, receives all inbound packets. Each packet is received by the external NIC 830 and checked 1010 for a MT6D profile. Those packets that do not match profiles are considered unsupported 845 and either blocked or delivered immediately to the host 1080 (depending on the security level of the host). Packets that match MT6D profiles have the tunnel header stripped off 1020, and are checked 1030 to see if the packet is using DSO. If the header is a DSO header, the packet is redirected (as shown at 1040 and 850) to the encapsulator 820 where it can be forwarded to the next DSO host or its final destination. If the packet is at its destination host, it is decrypted 1060 if necessary 1050. The source and destination addresses are then rewritten 1070 to the original packet header, and the packet is delivered 1080 to the host via the internal NIC 810.

Flow

FIG. 11A illustrates the flow of a single MT6D host. Each MT6D host runs two concurrent processes. One process 1110 controls the generation and advertisement of IPv6 addresses. The other process 1130 listens for and handles packets. Both processes rely on a threadsafe shared memory resource, which we refer to as the Shared Routing Table (SRT) 1125. When MT6D is initialized 1100, it will typically synchronize its clock 1105 with a universal time server. The purpose of this time sync is to allow $t_i$ to be as small as possible while minimizing packet loss.

We refer to the process 1110 that generates and advertises IPv6 addresses as the address obscurer. This is the process on the left side of FIG. 11A. The address obscurer is used to supply obscured IPv6 addresses to the SRT 1125. The first step of the address obscurer is to initialize the SRT 1125. For initialization, it is necessary to compute and store entries 1112 for the current and next time increments for all sender/receiver profiles. The MT6D host will also advertise 1114 its MT6D source addresses for each profile entry to the external network using NDP. After the SRT is initialized, the address obscurer will wait 1120 for the next time increment. When $t_i$ increments, the current MT6D addresses are overwritten 1122 by the future MT6D addresses and new future MT6D addresses are calculated 1116 and stored in the SRT 1125. The new future MT6D source addresses are again advertised 1118 to the gateway devices.

The listener process 1130 continually listens 1132 for packets. Each time a packet is detected 1134, a sub-process, called a packet handler 1140, is spawned 1136. The packet handler 1140 first determines 1142 whether the packet is outbound or inbound. Outbound packets are sent to the encapsulator (see FIG. 9) for obscuration 1145 and transmission 1147. The encapsulator 820 fetches the MT6D addresses and symmetric key from the SRT 1125 to use in constructing the MT6D packet. Inbound packets are sent to the decapsulator (see FIG. 10) for processing 1146 and transmission. If the packet is using DSO 1148, the packet is redirected to the encapsulator and retransmitted. Otherwise, the decapsulator fetches the original addresses and symmetric key from the SRT 1125 and delivers 1150 the packet to the host.

The SRT is a shared storage resource. It is shared by both the address obscurer and the listener. Its purpose is to provide a central storage location for IPv6 addresses and symmetric keys. At all times, the SRT stores addresses for both $t_i$ and $t_{i+1}$. Expired addresses are purged from the SRT.

A conceptual view of how the invention operates is shown in FIG. 11B. For packet 1161 originating at Host A 1160, the invention implemented by MT6D 1170 changes address A to address S and address B to address T, which is how the packet is viewed as traffic (1174, 1176) over Internet 1175 within the MT6D secured communication zone 1173 before the addresses are changed back to address A and address B by MT6D 1180 for receipt 1191 by Host B 1190. For packet 1193 originating at Host B 1190, the invention implemented by MT6D 1180 changes address B to address X and address A to address Y, which is how the packet is viewed as traffic (1174, 1176) over Internet 1175 within the MT6D secured communication zone 1173 before the addresses are changed back to address B and address A by MT6D 1170 for receipt 1163 by Host A 1160. Assuming $t_i$ has incremented between packets 1161 and 1191, address pair <Y,X> will be different from address pair <S,T>.

Similarly, for packet 1165 originating at Host A 1160, the invention implemented by MT6D 1170 changes address A to address G and address B to address H, which is how the packet is viewed as traffic (1174, 1176) over Internet 1175 within the MT6D secured communication zone 1173 before the addresses are changed back to address A and address B by MT6D 1180 for receipt 1195 by Host B 1190. For packet 1197 originating at Host B 1190, the invention implemented by MT6D 1180 changes address B to address M and address A to address N, which is how the packet is viewed as traffic (1174, 1176) over Internet 1175 within the MT6D secured communication zone 1173 before the addresses are changed back to address B and address A by MT6D 1170 for receipt 1167 by Host A 1160. As before, address pair <G,H> differs from address pair <Y,X>, and address pair <N,M> differs from address pair <G,H> if $t_i$ has incremented in the respective intervals.

Implementation

The two most common implementations of MT6D are either as embedded software on the host or as a separate gateway device. Both implementations adopt a trust model that assumes trust only between the sender and receiver. In a trust model where all insiders are trusted, the gateway implementation can be expanded to the border of a trusted network.

Embedded Software

Figure 12A:
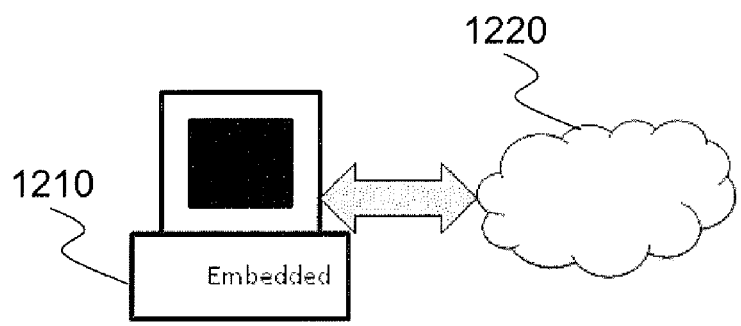
FIG. 12A is a schematic showing the invention embedded on a host device in software.

One possible implementation of MT6D is to embed it onto the host device 1210 for use over a network 1220 as illustrated in FIG. 12A. This option has a number of advantages. The biggest advantage is mobility. By hosting MT6D on the host device, MT6D can be implemented on handheld devices. Another advantage is cost. Since MT6D is loaded directly onto the host device, there is no requirement to purchase additional hardware. By having MT6D on the host device, managing the configuration is also easier. There is no need to transfer keys or preferences to a separate device.

Gateway Device

Figure 12B:
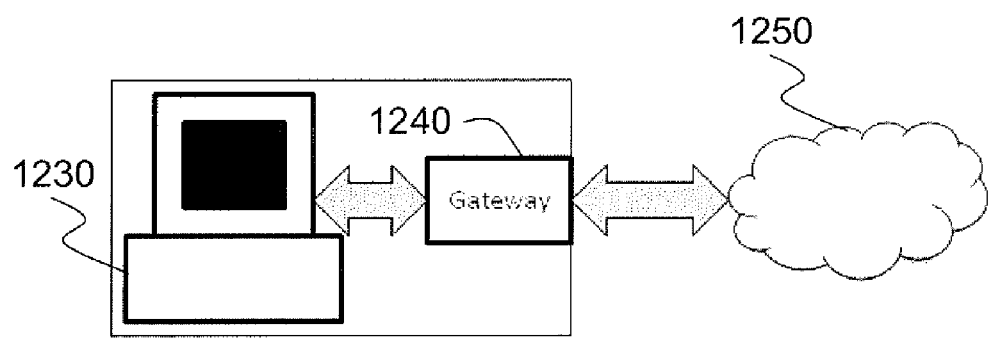
FIG. 12B is a schematic showing the invention implemented as a stand-alone gateway device.

Implementing MT6D on a separate gateway device, as shown in FIG. 12B, is another option. An MT6D gateway 1240 is transparent to the user on host device 1230 for use over a network 1250. All a user has to do to use the MT6D gateway 1240 is plug it in and connect network cables. This is especially useful if the user has devices running different operating systems. In this configuration, MT6D is platform independent. Probably the biggest advantage of implementing MT6D in a gateway device 1240 is that the computational complexity of using MT6D is offloaded to the MT6D gateway.

As mentioned, MT6D can be implemented on a border device in a trusted environment. Implementing MT6D in this fashion mimics a Virtual Private Network (VPN). The main difference, which is an improvement over traditional VPNs, is that addresses sent over the external network are constantly rotating. There are two benefits to implementing MT6D in this fashion over the already stated benefits of a gateway implementation. First, internal hosts can communicate internally without any performance degradation. Second, network administrators can manage internal host activities, which would be obscured in a host-based MT6D implementation.

While compromise of user privacy from host configuration of Internet addresses under IPv6 prompted development of the present invention, the protection offered by the invention can extend to any network protocol.

While the invention has been described in terms of preferred embodiments, those skilled in the art will recognize that the invention can be practiced with modification within the spirit and scope of the appended claims.

The invention claimed is:

1. A method for obscuring network and transport layer addresses in communication between two hosts, comprising:
   rotating host portions of packet addresses based upon a frequently changing nonce known only to the two communicating hosts; and
   dynamically obscuring port numbers of sending and receiving hosts.

2. The method of claim 1 further comprising encrypting each packet using a symmetric key known only by the two communicating hosts.

3. The method of claim 1, wherein the packet address is obscured with a set of parameters when the nonce changes.

4. The method of claim 1 wherein the packet address for a host is computed by a functional combination of three values:
   a value specific to the host;
   a secret value known only to the two communicating hosts; and
   the value of the changing nonce when the packet is sent.

5. The method of claim 4 wherein the secret value is a symmetric key.

6. The method of claim 4 wherein the changing nonce is derived from a timestamp.

7. The method of claim 4 wherein the functional combination is obtained by concatenating the three values and hashing the concatenation.

8. The method of claim 1 wherein each host is able to predict packet addresses being used by the other communicating host without handshaking.

9. The method of claim 1 wherein an address rotation interval is no smaller than twice the single-trip time of a packet sent between the two hosts.

10. The method of claim 2 wherein the symmetric key is dynamically regenerated.

11. A system for obscuring network and transport layer addresses in communication between two hosts, the system comprising processors connected to computer readable storage media having instructions which, when executed by the processors, cause the processors to:

rotate host portions of packet addresses based upon a frequently changing nonce known only to the two communicating hosts; and dynamically obscure port numbers of sending and receiving hosts, wherein the processors and computer readable storage media are part of the two communicating hosts, gateway devices, or a combination of hosts and gateway devices.

12. The system of claim 11, wherein the instructions, when executed by the processors, further cause the processors to encrypt each packet using a symmetric key shared by the two communicating hosts.

13. The system of claim 11, wherein the packet address is obscured with a set of parameters when the nonce changes.

14. The system of claim 11 wherein the packet address for a host is computed by a functional combination of three values:

a value specific to the host;

a secret value known only to the two communicating hosts; and the value of the changing nonce when the packet is sent.

15. The system of claim 14 wherein the secret value is a symmetric key.

16. The system of claim 14 wherein the changing nonce is derived from a timestamp.

17. The system of claim 14 wherein the functional combination is obtained by concatenating the three values and hashing the concatenation.

18. The system of claim 11 wherein each host is able to predict packet addresses being used by the other communicating host without handshaking.

19. The system of claim 11 wherein an address rotation interval is no smaller than twice the single-trip time of a packet sent between the two hosts.

20. The system of claim 12 wherein the symmetric key is dynamically regenerated.

21. The method of claim 1, further comprising dynamically masking the subnets of the communicating hosts.

22. The system of claim 11, wherein said instructions, when executed by the processors, further cause the processors to dynamically mask the subnets of the communicating hosts.

* * * * *